May 28, 1963 A. W. SHARP 3,091,099
APPARATUS FOR CONTINUOUS CHILLING OF POULTRY
Filed Feb. 9, 1959 5 Sheets-Sheet 1
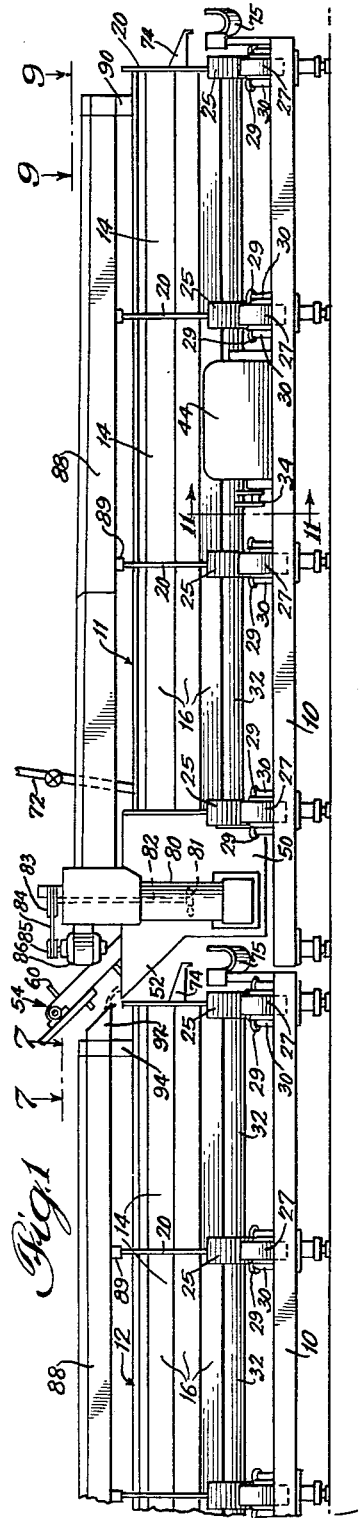
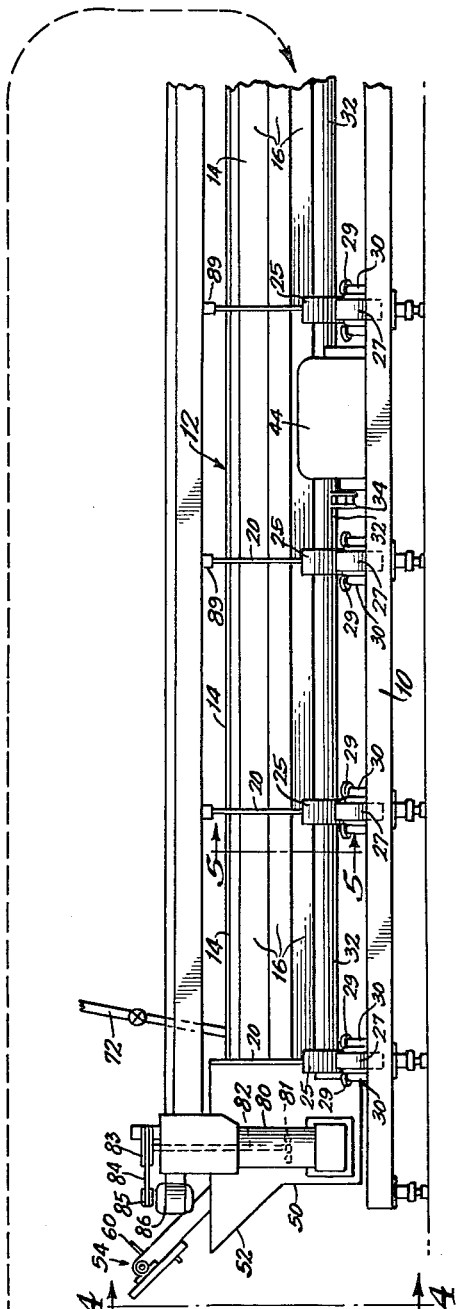
INVENTOR:
Allen W. Sharp,
BY Bair Freeman & Molinare
ATTORNEYS.

May 28, 1963 A. W. SHARP 3,091,099
APPARATUS FOR CONTINUOUS CHILLING OF POULTRY
Filed Feb. 9, 1959 5 Sheets-Sheet 2
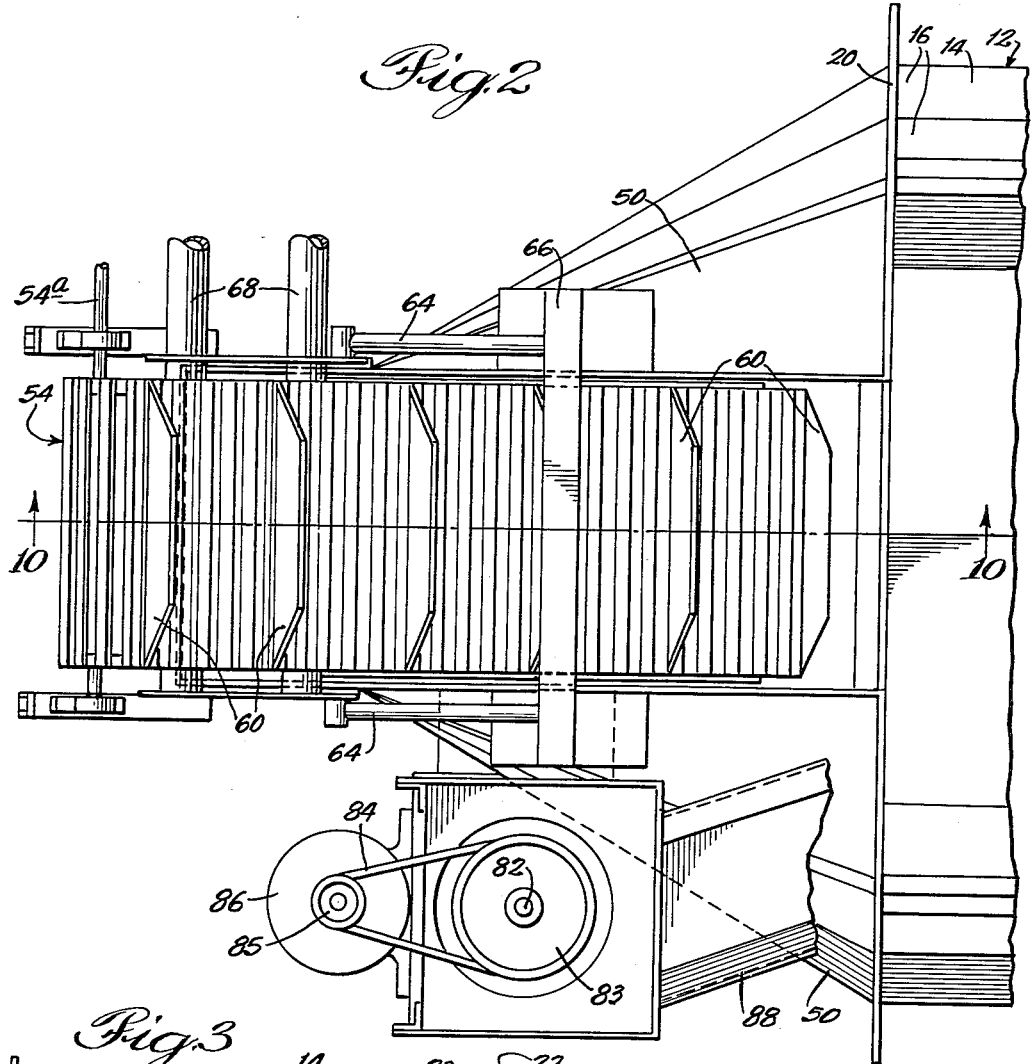
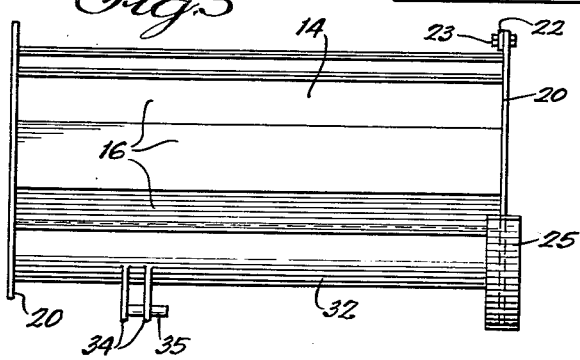
INVENTOR:
Allen W. Sharp,
BY Bair, Freeman & Molinare
ATTORNEYS.

May 28, 1963

A. W. SHARP 3,091,099

APPARATUS FOR CONTINUOUS CHILLING OF POULTRY

Filed Feb. 9, 1959

INVENTOR:
Allen W. Sharp,
BY Bair, Freeman & Molinare
ATTORNEYS.

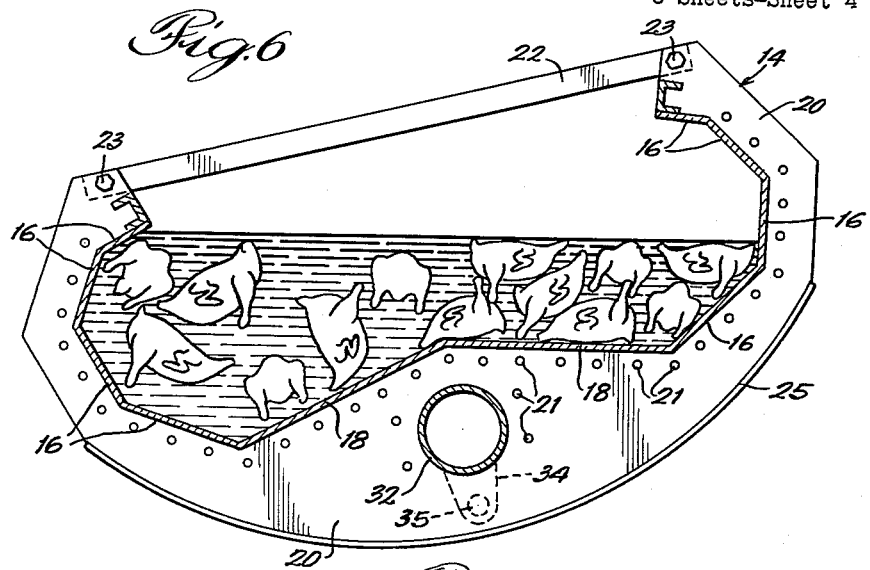
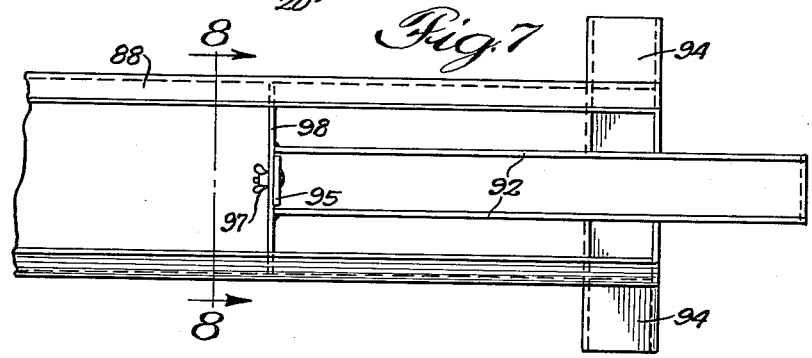
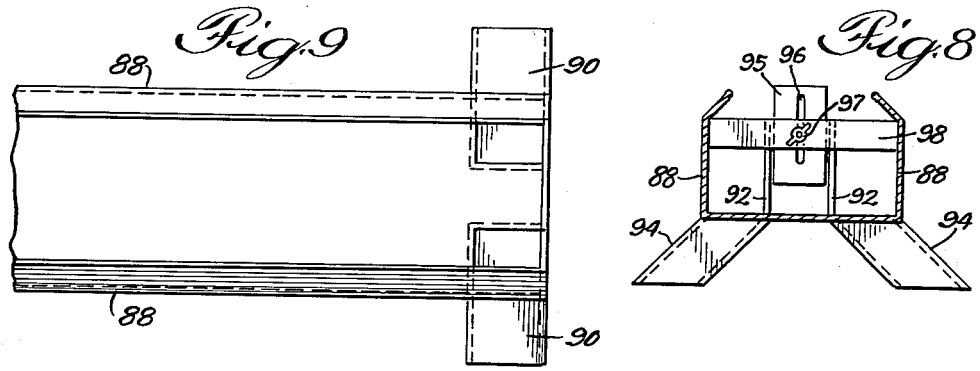

May 28, 1963 A. W. SHARP 3,091,099
APPARATUS FOR CONTINUOUS CHILLING OF POULTRY
Filed Feb. 9, 1959 5 Sheets-Sheet 5

INVENTOR:
Allen W. Sharp,
BY Baer, Freeman & Molinare
ATTORNEYS.

though, the *fowls* when stored in the tanks are covered by

United States Patent Office
3,091,099
Patented May 28, 1963

3,091,099
APPARATUS FOR CONTINUOUS CHILLING OF POULTRY
Allen W. Sharp, Ottumwa, Iowa, assignor, by mesne assignments, to Equity Financial Corporation, a corporation of Delaware
Filed Feb. 9, 1959, Ser. No. 792,054
7 Claims. (Cl. 62—376)

This invention relates to a novel process and apparatus for the continuous and automatic chilling of eviscerated fowls preparatory to packing and shipping, or storage.

The general practice currently and extensively used for chilling of fowls involves placing of the eviscerated fowls into tanks containing crushed ice and some water for effecting heat transfer from the body of the fowls. Generally, the fowls when stored in the tanks are covered by crushed ice. In some poultry processing plants an air agitation system is employed wherein compressed air is introduced through apertured pipes, extending across the lower portion of the tanks. The air discharged from the pipes causes agitation of the water within the tanks to insure better contact of the cold water with the fowls to expedite the chilling operation. Such systems of chilling of fowls necessitates the fowls remaining within the ice filled tanks for approximately 1½ hours, depending upon the size of the fowls, so as to reduce the body temperature of the fowls to the general range of 40° F.

The currently used chilling systems necessitates the use of many chill tanks for temporary storage of fowls while being chilled, and requires a substantial amount of floor space for storage and movement of the tanks to and from the receiving stations, storage stations and packing stations. In some processing plants, after the eviscerating operation is complete, some of the fowls are permitted to remain in the chill tanks over night, in order to effect efficiency of production in the plant. By this practice, the personnel engaged in packing of the chilled fowls will be able to commence their operations the following morning at the same time that other personnel commence the various other processing operations; otherwise, the personnel engaged in packing, if they completed packing all fowls processed during the day, would be required to perform their operations for an additional two to three hours after other personnel have completed their work. Likewise, such packing personnel would have no work to perform for two to three hours on the following morning until completely eviscerated and chilled fowls were again available for packing.

Recently, there has been made available to fowl processers, apparatus for automatically and continuously chilling eviscerated fowls. These more recent types of apparatus possess various disadvantages and limitations, the main one being that the fowls, in the process of chilling, are caused to abut and contact various pieces of apparatus numerous times while undergoing the chilling process, resulting in some bruising or injury to the skin or flesh of the fowls. Another disadvantage of certain of the more recent types of continuous chilling apparatus is that excess water is driven under the skin of the fowls to the extent that they are considered adulterated and not capable of passing Government inspection. Another disadvantage of the recently available apparatus for continuous chilling of fowls results from the design and construction of the apparatus, which does not lend itself to ready and convenient cleansing and scrubbing of the film of protein from the walls and surfaces of the apparatus that are subject to contact by the water used in the chilling of the fowls. It is necessary to properly and thoroughly cleanse such surfaces of the apparatus daily to make certain of removal of residue and the film of protein, and thereby reduce possible bacteria build-up on such surfaces. Apparatus of this type is now subject to frequent examinations by Government inspectors to determine the degree of cleanliness or sanitation, and compliance with existing regulations.

One of the objects of the present invention is to provide a novel process and apparatus for continuous chilling of eviscerated fowls in an efficient manner, and wherein the chilling of all fowls is relatively uniform.

Another object is to provide an improved process and apparatus for continuous chilling of eviscerated fowls in a manner to effect a substantial savings in the amount of water consumed, as well as ice used, and to effect a reduction in the amount of labor and space required.

A further object is to provide a novel process and apparatus for continuous chilling of eviscerated fowls, while at the same time simultaneously providing an extremely thorough final washing operation upon the fowls.

Still another object is to provide an improved process and apparatus for continuously chilling eviscerated fowls wherein the fowls are caused to be freely and unrestrictedly turned and repositioned in a gently agitated body of water which minimizes possible injury or damage to the skin or flesh of the fowls.

Still another object is to provide a novel process and apparatus for continuously chilling eviscerated fowls in a manner wherein the fowls are immersed in water, in a partially buoyant state, during substantially the entire chilling operation and are at all times free to turn and roll and become repositioned for effecting efficient chilling of the fowls.

It is also an object of the present invention to provide a novel and improved apparatus for continuous chilling of eviscerated fowls which is relatively simple in construction, inexpensive to manufacture and operate, and which may be quickly and easily cleansed for maintaining a high degree of sanitation during the chilling process of the fowls.

Other objects and advantages of the present invention will be apparent from the following description, taken in connection with the accompanying drawings, in which:

FIGURE 1 is a side elevational view of the chilling apparatus embodying the present invention.

FIGURE 2 is an enlarged plan view, approximately four times the scale of FIGURE 1, of the rear-end portion of one of the chill tank units.

FIGURE 3 is an enlarged, side elevational view of one of the individual sections of one of the tanks.

FIGURE 6 is a cross-sectional view similar to FIGURE 5, showing the tank at one limit of oscillating movement.

FIGURE 7 is a plan view of the discharge end of one of the water flumes, taken as indicated at line 7—7 on FIGURE 1.

FIGURE 8 is a cross-sectional view through the end portion of one of the flumes, taken as indicated at line 8—8 on FIGURE 7.

FIGURE 9 is a plan view of the discharge end of the flume of the other tank, taken as indicated at line 9—9 on FIGURE 1.

FIGURE 10 is an enlarged, vertical sectional view through the rear end portion of one of the tanks, taken substantially as indicated at line 10—10 on FIGURE 2.

FIGURE 11 is an enlarged, fragmentary view through the lower portion of one of the tanks, taken substantially as indicated at line 11—11 on FIGURE 1, showing the drive mechanism for oscillating the tank.

The novel process and apparatus embodying the present invention permits continuous and automatic chilling of eviscerated fowls in an expeditious manner. It is highly desirable to effect chilling of the eviscerated fowls as rapidly as possible in order to obtain better shelf life of the fowls, and better control and reduction in growth of bacteria.

In the construction disclosed, the apparatus provides two-stage chilling of the eviscerated fowls, and comprises two sets of apparatus arranged in cooperative end-to-end relation. Each set of apparatus comprises a main supporting structure, as indicated generally at 10, on which are mounted for transverse rocking or oscillating movement, upwardly open, elongated tanks 11 and 12. Each of the tanks, for convenience in manufacture, is composed of a plurality of sections or units, as indicated at 14, and seen in FIGURES 3 and 5 of the drawings. Each of these tank sections is formed of sheet metal and, as may be seen in FIGURE 5 of the drawings, the sides are composed of a plurality of angularly related flat portions 16, which merge at their lower edges into a bottom composed of two flat sections 18, which are connected together, and which extend upwardly toward the center of the tank, so that the bottom at the longitudinal center is considerably higher than the remaining bottom portion of the tank, for purposes which will hereinafter be described.

Figure 4:
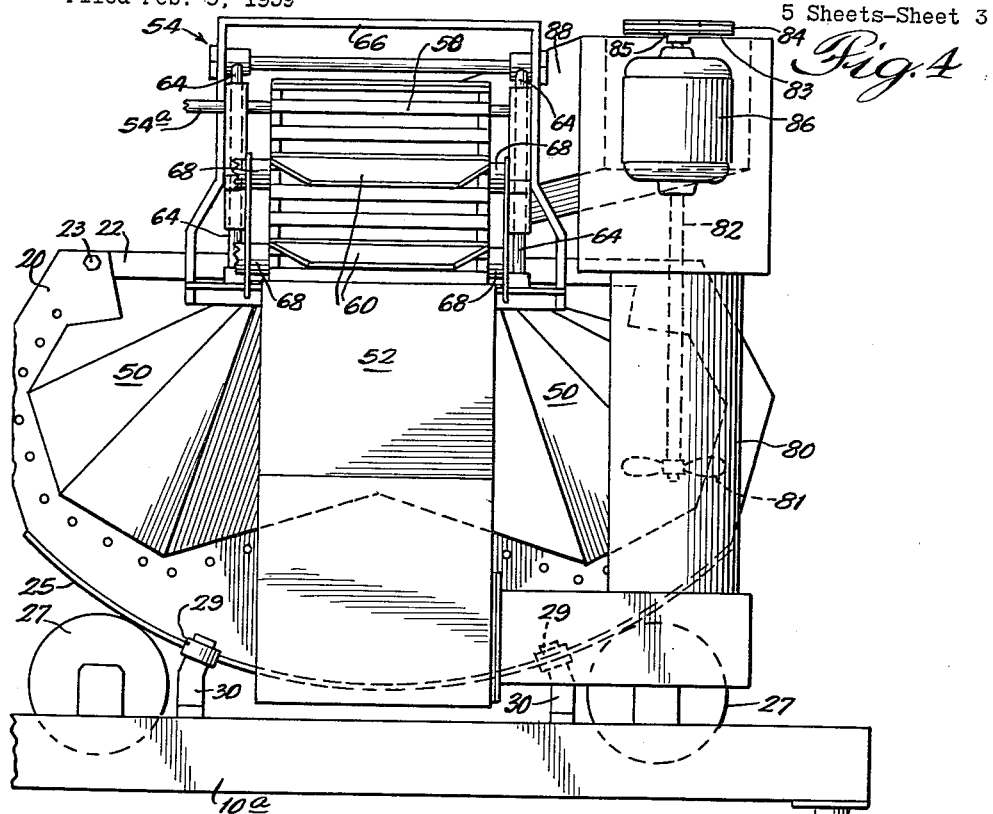
FIGURE 4 is an enlarged rear-end view of one of the tanks, taken substantially as indicated at line 4—4 on FIGURE 1.

At both ends of each tank section there is provided a laterally extending flange 20, formed with suitable apertures as indicated at 21, so that adjacent tank sections may be placed in end-to-end alignment and fixedly secured together by bolts (not shown) extending through the apertures 21 of the two abutting flanges of the adjacent sections. The upper ends of the flange at one end of each section are reinforced by a tie bar 22, which is connected at its ends, to the flange 20, by bolts 23. The lower portion of the flange 20 of each section is arcuately formed, and to which is welded an arcuately formed track 25. When the tank sections are connected together by bolting of their flanges 20, the assembly is placed for support on the frame 10, with the track members 25 seated upon sets of rollers 27, journalled on cross members 10a of the frames 10, so as to provide guidance for the tank, composed of the plurality of sections or units, during rocking or oscillating movement of the tank. To preclude endwise shifting of the assembled tank with respect to its frame 10, I provide a pair of guide rollers 29, carried by supports 30, secured to the cross members 10a of the main frames 10, as seen in FIGURE 4 of the drawings. The set of guide rollers 29 engage opposite edges of one of the tracks of one of the sections of the tank, and thereby preclude end-wise shifting of the tank relative to the supporting frame 10.

The flanges 20 at opposite ends of each tank section are reinforced and interconnected by a relatively larged sized pipe or tube 32, positioned below the bottom 18 of the tank section, and butt-welded at its ends to the inner surfaces of the respective flanges 20.

The construction and arrangement of mechanism for rocking or oscillating the tanks 11 and 12 is identical and therefore I will describe one of such mechanisms, and like parts for both mechanisms will be accorded the same reference numerals. Welded to the underside of the pipe 32 of one of the sections of each of the tanks is a pair of closely spaced apart, downwardly extending lugs or ears 34, carrying a crank pin 35. A crank arm 36 is connected at one end to the pin 35, and the opposite end is journalled on a crank pin 38, carried on a crank disc 40 in the nature of a pulley driven by a belt 42, from a motor driven speed reducer assembly, indicated generally at 44, carried on the main frame or support 10. It is to be understood that the motor driven speed reducer unit is of the type capable of selective adjustment for varying the speed so that it is possible to rock or oscillate the respective tanks 11 and 12, by the independent drive mechanisms at a desired rate of speed. Preferably, the two tanks 10 and 11 are oscillated at the same rate of speed and in unison.

For purposes as will hereafter appear, each of the tank units 11 and 12 are composed of a different number of sections, and each of the rear-end portions of the respective tanks are provided with a special tank section formed of sheet metal and indicated generally at 50. The end tank sections are each formed with a rearwardly and upwardly sloping wall portion 52, so as to accommodate within the tank section 50 a bodily movable elevator, as indicated at 54. The elevator is formed with a unitary frame structure, as indicated generally at 56, upon which is totally supported a conveyor belt 58, having a plurality of spaced apart flights, as indicated at 60. Connected to the lower end of the frame of the elevator is a depending bracket 62, adapted to rest on the bottom of the special tank section 50, as seen in FIGURE 10 of the drawings, for supporting the elevator in a proper operative position. The elevator frame is connected by a pair of parallel links 64, to an upright support 66, so that the elevator as a unit may be moved up out of the sump of the tank, i.e. the special end section 50, so that it may assume a position as indicated in dot-and-dash outline in FIGURE 10, at which position the elevator and the special tank 50 may be thoroughly cleansed for purposes of sanitation, as hereafter referred to. The frame of the elevator is provided with a pair of laterally extending supports 68, to which may be connected any suitable power source, which may be a hydraulic jack or hand-crank adapted for raising or lowering the elevator out of and in to operative position with respect to the special end tank section 50. The support 66 is rigidly attached to the special tank section so that the elevator mechanism becomes a unitary part of the tank assembly and rocks or oscillates therewith. It is to be understood thaat suitable power drive means (not shown) for the head shaft 54a of the elevator are totally supported with the elevator on the special end section 50 of the tank.

Each of the tanks is provided with a source of tap water, through a valved conduit or pipe, as indicated at 72, for discharging into and adjacent the rear end of each of the respective tanks 11 and 12. The rear end section 50 of each tank is welded to the end flange of the last of the conventional sections 14, and has its bottom portion disposed a substantial distance below the bottom of the respective sections 14 comprising the tank, as may be seen in FIGURE 10. Accordingly, the water from the tank proper flows into and fills up the special tank section 50, so that there is a uniform level of water throughout all sections of each of the two tanks. For draining of water from each of the tanks, such as for cleaning, each of the respective special end sections 50 is provided with a drain plug 73 in its bottom wall. To take care of any overflow in each of the tanks, and to maintain a predetermined water level in the tanks, the foremost tank section 14 of each of the tanks is provided with an overflow spout, as indicated at 74, for discharging overflow water into a trough 75, fixedly mounted on the respective main frames 10, as shown in FIGURE 1 of the drawings.

Associated with each of the special tank sections 50, is a water circulating unit comprising an upright duct 80, opening at its lower end into the bottom portion of the special tank sections 50. Mounted within the upright duct 80, is an impeller 81, mounted on a shaft 82, provided at its upper end with a pulley 83, driven by a belt 84, from a pulley 85, mounted on the end of the motor 86. The impeller and its drive mechanism is totally supported on the upright duct 80, as seen in the drawings. The upper part of said duct communicates with an upwardly open, horizontally extending water flume 88, the main portion of which extends essentially centrally and longitudinally of the respective tanks 11 and 12. The impeller serves to remove water from the bottom of the special rear-end tank section 50, and discharges it into the flume 88. The flume, throughout its length, is supported by cross-bars 89, extending across the tank sections. The forward end of the flume for the tank 11 is closed and terminates in a pair of downwardly and laterally extending, oppositely disposed discharge conduits 90, adjacent the outer end of the foremost tank section 14 of the tank 11. The forward end of the flume for the tank 12 is provided with an intermediate trough 92, of smaller cross-section than the flume 88, as seen in FIGURES 7 and 8 of the drawings, and the portion of the flume on opposite sides of the trough terminate in a pair of downwardly and laterally extending oppositely disposed discharge ducts 94. The inner end of the trough 92 is controlled by a gate 95 having a slot 96, through which extends a wing-nut bolt 97, carried on cross brace 98, so that said gate may be adjusted vertically in height to provide a predetermined cross sectional opening for the flow of water through the trough 92. As may be seen in FIGURE 1 of the drawings, the outer end of the trough 92, is positioned so as to discharge water into the rear special tank section 50 of the tank 11.

It is to be understood that the two tank units 11 and 12, are independently oscillated by their separate mechanism, and the discharge end of elevator 54 of the tank 11 is at all times positioned in registration with and extending over the forward end of the tank 12.

In operating the apparatus, each of the tanks 11 and 12 are first filled with cool tap water. The second tank, namely tank 12, in addition is supplied with ice, and the temperature of the water in tank 12 is initially reduced to a temperature approximating 32° F., and when fowls are introduced therein, I continue to add ice in controlled amounts so as to compensate for heat exchange between the fowls being chilled and the water for maintaining the water temperature in tank 12, at approximately 34° F.

Figure 5:
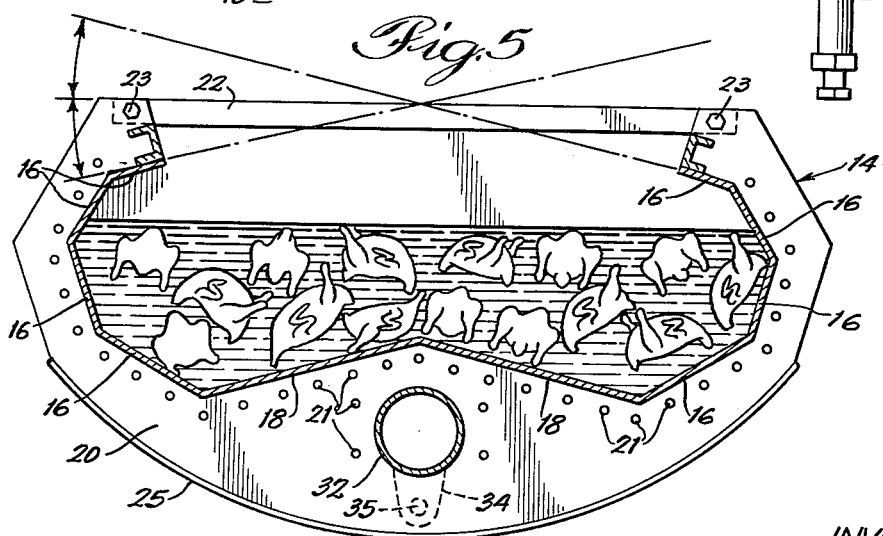
FIGURE 5 is an enlarged cross-sectional view through a section of one of the tanks, taken substantially as indicated at line 5—5 on FIGURE 1.

After the proper amount of water is in the tanks and the water in tank 12 is at a proper temperature, the tanks are then set into motion and are rocked or oscillated laterally, and the elevators operated and the water recirculation apparatus is also placed in operation. As seen in the drawings, the angle of oscillation or rocking is relatively small and which, in the construction as shown, is approximately 13° above and below horizontal, as represented in FIGURES 5 and 6 of the drawings. Fowls are then introduced into the tank 11 at the right hand end, as seen in FIGURE 1, and the water recirculating impeller units function to continuously withdraw water from the rear ends of the tanks 11, and 12, adjacent the bottom of the special tank sections 50, and discharge it into the flume 88. The water in the flume 88 of tank 11, is discharged through the two laterally directed ducts 90, at the forward end of the tank 11, as seen at the right hand portion of FIGURE 1 of the drawings. Thus, the cool tap water within the tank 11, is continuously recirculated, setting up water currents which, together with the oscillation or rocking action of the tank, causes the fowls to be freely and unrestrictedly turned, rolled and repositioned, in a partially buoyant state, and simultaneously moved rearward in the tank toward the rear end, where they eventually come into contact with the flights 60 of the elevator 54, and are picked up and conveyed in an upwardly direction and discharged into the right hand end of the tank 12, which contains relatively cold ice water.

During the time that the fowls are moved along in tank 11, they are first subjected to a preliminary cooling action for reducing their body temperatures to approximately the temperature of the tap water. Because of the rocking action, the fowls are subjected to a gentle agitating action wherein water is continuously flowing around and into the cavities of the bodies of the fowls, thus effecting a thorough cleansing or washing action upon the fowls while simultaneously effecting a preliminary chilling action thereon. As may be seen in comparing FIGURES 5 and 6 of the drawings, the fowls are caused to be continuously and freely moved and repositioned incident to the sloshing action of the water created by the water being moved from side to side incident to the rocking or oscillating action of the tank. This gentle oscillating action provides sufficient agitation for the body of water for effecting a rapid heat exchange between the fowl and the body of water. The gentle agitating action is the result of the novel form of the bottom of the tank wherein a portion thereof extends upwardly a substantial distance above other portions of the bottom of said tank. The angularly related side wall portions of the tank serve to further augment the agitation imparted to the body of water, and thence to the fowls.

The configuration, in cross section, of the similar tank sections identified by the reference numeral 14, is deemed to be of substantial importance as it concerns the provision of a portion of the bottom of the tank being higher than another portion or portions of the bottom of said tank. If the tank were of generally arcuate cross-section rocking or oscillating action would not cause agitation of the body of water. The body of water would tend to remain relatively stationary while the tank would move thereabout. It is recognized that various other cross-sectional forms may be effectively used. For example, the side walls of the tank may be of generally arcuate form, with the inner surfaces of the side walls being concave, and the lower portions of the side walls merging into a bottom, a portion of which extends upwardly, and is of convex, arcuate form.

When the fowls have been transferred from tank 11 to tank 12, they are again subjected to a similar gentle agitating action for causing free, unrestricted turning, rolling and repositioning in a partially buoyant state in the ice water in tank 12. The fowls are caused to progress rearwardly in the tank 12 by the combined action of agitation of the water, together with the recirculation of the water through the impeller action, withdrawing water from the bottom of the rear special tank section 50, and discharging it into the flume 88, and the water flowing forwardly in the flume discharges into the two laterally and downwardly extending ducts 94 adjacent the forward or right hand end of the tank 12, as seen in FIGURE 1 of the drawings. Depending upon the temperature within the tank 12, a portion of the water within the tank 12 may be caused to be discharged through the opening controlled by the gate 95, into the trough 92, and thence into the rear section 50 of the tank 11, so that, if desired, a portion of the relatively cold ice water may be introduced into the tank 11 for reducing its temperature a desired amount for more efficiently effecting a preliminary chill of the fowls while they are passing through the tank 11.

It may be understood that in the construction as herein illustrated, eviscerated fowls may be introduced into the right hand end of the tank 11 at the rate of approximately 50 per minute, or 3,000 per hour, and the capacity of the tank 11, composed of three sections 14, is such as to accommodate 500 fowls at one time. Due to the rate of oscillation or rocking of the tank, and the rate of recirculation of the water within the tank, the fowls, before being elevated and discharged from the tank 11, remain therein for approximately 10 minutes.

The tank 12 being twice the length of tank 11, accommodates approximately 1000 fowls at one time, and the fowls remain in the relatively cold water for approximately 20 minutes. After the fowls have progressed to the rear end of the tank 12, they are picked up by the flights of the elevator 54 and conveyed out of the tank and discharged at a suitable station, where the fowls are further conveyed to a packing station; or conveyed first to a station where the giblets are inserted into the cavity of the fowls preparatory to packing.

It will be apparent that due to the gentle agitation of the water in the respective tanks, the layer of water in direct contact with the fowls is continuously being replaced, and serves to effect a rapid rate of heat exchange. The recirculation of the water in the tanks, in addition, insures that all of the fowls are continuously being subjected to contact with additional water in a controlled manner, and the chilling operation is efficiently performed without possible injury to the skin or flesh of the fowls. Discharging recirculated water adjacent the outer corners of the first section of each tank, insures against fowls remaining in the corner zones while the chilling operation is being performed.

It will be readily appreciated that due to the rocking or oscillating action of the tank, the movement of the body of water is equivalent to pouring water from one side to the other, and which action, likewise, causes transverse movement of the fowls while simultaneously causing turning and rolling of the fowls while they are moving forwardly in the tanks. The agitating action of the body of water insures continuous replacement and contact of water with the skin of the fowls to expedite heat interchange, and thereby rapidly and efficiently chilling the fowls. Without such agitated water action, the film of water in direct contact with the bodies of the fowls acts as an insulator and tends to reduce the rate of heat exchange.

The supply of tap water to the tank 11 may be continuous so as to keep the body of water in the tank 11 relatively cool for effecting the preliminary cooling of the fowls. As above indicated, the temperature of the water in the tank 11 may be further reduced somewhat by discharging into said tank a controlled quantity of cold ice water from tank 12. The introduction of tap water into tank 12 desirably is correlated with the introduction of ice therein so as to make certain of maintaining the temperature of the water approximately at 32° to 34° F. for effecting the final and efficient chilling of the fowls.

Although I have herein shown and described certain preferred embodiments of my invention, manifestly it is capable of modification and rearrangement without departing from the spirit and scope thereof. I do not, therefore, wish to be understood as limiting this invention to the precise embodiments herein disclosed, except as I may be so limited by the appended claims.

I claim:

1. Apparatus for chilling eviscerated fowls comprising a support, an elongated, upwardly open tank, adapted to contain water, mounted for laterally rocking movement on the support, means for rocking said tank, said tank containing means formed as a fixed part thereof for causing agitation of the water incident to said rocking movement, and an elevator mounted on and adapted for rocking movement with the tank, said elevator having a portion extending down into the tank at said one end and having a portion extending rearwardly above said tank.

2. Apparatus for chilling eviscerated fowls comprising a support, an elongated, upwardly open tank, adapted to contain water, mounted for laterally rocking movement on the support, means for rocking said tank, said tank containing means formed as a fixed part thereof for causing agitation of the water incident to said rocking movement, an elevator having a portion normally extending down into the tank, at said one end, and having a portion extending rearwardly above the tank, and means mounting said elevator on the tank, whereby to permit rocking movement therewith, said last mentioned means being constructed and arranged for raising the elevator out of operative position in the tank.

3. Apparatus for chilling eviscerated fowls comprising a support, an elongated, upwardly open tank adapted to contain water, said tank having its bottom wall formed with a longitudinal, central portion extending above another portion of said bottom wall, said tank being mounted for transverse rocking movement on the support, and means for rocking the tank on said support.

4. Apparatus for chilling eviscerated fowls comprising a support, an elongated, upwardly open tank adapted to contain water, said tank having its bottom wall formed of a plurality of relatively flat, longitudinally extending sections, with adjacent sections disposed in an angular relation to each other, means for mounting said tank for transverse rocking movement on the support, and means for rocking the tank on said support.

5. Apparatus for chilling eviscerated fowls comprising a support, an elongated, upwardly open tank adapted to contain water, said tank having its bottom wall formed of a plurality of relatively flat, longitudinally extending sections, with adjacent sections disposed in an angular relation to each other, the two central-most sections adjacent the longitudinal center of the tank being formed and connected to provide an elevated ridge extending above other portions of the bottom wall of the tank, means for mounting said tank for transverse rocking movement on the support, and means for rocking the tank on said support.

6. Apparatus for chilling eviscerated fowls comprising a support, an elongated, upwardly open tank adapted to contain water, said tank having its bottom and side walls formed of a plurality of relatively flat, longitudinally extending sections, with adjacent sections disposed in an angular relation to each other, means for mounting said tank for transverse rocking movement on the support, and means for rocking the tank on said support.

7. Apparatus for chilling eviscerated fowls comprising a support, an elongated, upwardly open tank adapted to contain water, mounted for lateral rocking movement on the support, means for rocking said tank, said tank being formed for causing agitation of the water incident to said rocking movement, a water flume mounted on and extending substantially the length of the tank, and rockable with the tank, and means for removing water from one end of the tank and discharging it onto the flume, the terminal portion of the flume at the opposite end of the tank being formed to discharge water from the flume into said opposite end of the tank.

References Cited in the file of this patent

UNITED STATES PATENTS

| | | |
|---|---|---|
| 1,420,740 | Peterson | June 27, 1922 |
| 1,458,991 | Pique | June 19, 1923 |
| 1,907,649 | Marx | May 9, 1933 |
| 1,924,988 | Grayson et al. | Aug. 29, 1933 |
| 1,937,422 | Bonish | Nov. 28, 1933 |
| 1,924,988 | Grayson et al. | Aug. 29, 1933 |
| 2,601,411 | McLaughlan | June 24, 1952 |
| 2,825,927 | Lapeyre et al. | Mar. 11, 1958 |
| 2,920,462 | Roser et al. | Jan. 12, 1960 |
| 2,942,429 | Van Dolah et al. | June 28, 1960 |

FOREIGN PATENTS

| | | |
|---|---|---|
| 547,097 | Canada | Oct. 8, 1957 |